United States Patent [19]

Neuray et al.

[11] 4,009,148
[45] Feb. 22, 1977

[54] HIGH MOLECULAR WEIGHT POLYCARBONATES OF $\alpha,\alpha,\alpha,\alpha',\alpha',\alpha'$-HEXAKISARYL-1,3-AND/OR -1,4-DIMETHYL BENZENES

[75] Inventors: Dieter Neuray, Rumeln-Kaldenhausen; Erhard Tresper, Krefeld; Dieter Freitag, Krefeld-Traar, all of Germany

[73] Assignee: Bayer Aktiengesellschaft, Leverkusen, Germany

[22] Filed: May 21, 1975

[21] Appl. No.: 579,532

[30] Foreign Application Priority Data

May 24, 1974 Germany .................. 2425291

[52] U.S. Cl. .......................... 260/47 XA; 260/463; 428/412
[51] Int. Cl.$^2$ ........................ C08G 17/13
[58] Field of Search .......... 260/47 XA, 463, 619 A, 260/619 B, 395

[56] References Cited

UNITED STATES PATENTS 3,799,953 3/1974 Freitag et al. .............. 260/47 XA

OTHER PUBLICATIONS

Ber. Dtsch, Chem. GES. 37 (Ullmann et al.) 1904 pp. 2001–2008.

*Primary Examiner*—Theodore E. Pertilla
*Attorney, Agent, or Firm*—Gene Harsh; Lawrence S. Pope; Frederick H. Colen

[57] ABSTRACT

The present invention is related to high molecular weight polycarbonates based on aromatic dihydroxy compounds which contain 5 to 100 mol % preferably 20 to 100 mol % of structural units derived from $\alpha,\alpha,\alpha,\alpha',\alpha',\alpha'$-hexakisaryl-1,3-and/or -1,4-dimethyl benzene dihydroxy compounds. In a preferred embodiment, the polycarbonate is a copolymer of the hexakisaryl dihydroxy compounds and bisphenols known to be useful in producing polycarbonates. The residues of the hexakisaryl compound may be 5 to 90 mol %, preferably 20 to 70 mol % of the structural units. An especially preferred copolymer is that between the hexakisaryl compounds and $\alpha,\alpha'$-(hydroxyphenyl)-diisopropyl benzenes. These polycarbonates show improved heat stability and higher second order transition temperature points than conventional polycarbonates and are useful in applications involving high service temperatures such as electrical insulating film.

10 Claims, No Drawings

HIGH MOLECULAR WEIGHT POLYCARBONATES OF α,α,α,α′,α′,α′-HEXAKISARYL-1,3-AND/OR -1,4-DIMETHYL BENZENES

SUMMARY OF THE INVENTION

This invention relates to high molecular weight polycarbonates based on aromatic dihydroxy compounds containing from 5 mol % to 100 mol %, preferably from 20 mol % to 100 mol %, based on incorporated dihydroxy compounds, of structural units corresponding to the formula (V):

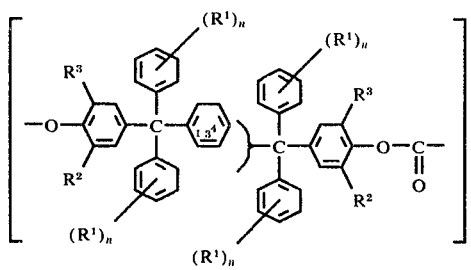

in which $R^1$ represents $C_1$–$C_4$ alkyl or halogen, but preferably H, $CH_3$, F, Cl or Br; $n = 1, 2$ or $3$; and $R^2$ and $R^3$, independently of one another, represent $C_1$–$C_3$ alkyl or halogen (for example Cl or Br), but are preferably H.

Through the presence in them of the bifunctional structural units of formula (V), the new high molecular weight homo- and co-polycarbonates according to the invention show improved dimensional stability under heat and a higher solidification point in relation to comparable polycarbonates which do not have any such structural units incorporated in them.

A preferred embodiment of the invention relates to high molecular weight polycarbonates based on aromatic bishydroxy compounds of which from 5 to 90 mol %, preferably from 20 to 70 mol %, consist of bifunctional structural units corresponding to formula (V) and from 95 to 10 mol %, preferably from 80 to 30 mol %, of structural units corresponding to the formula (VI):

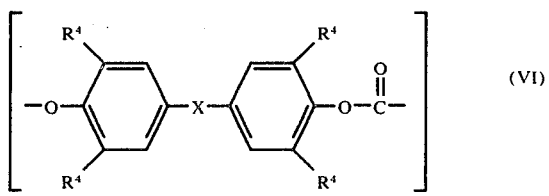

in which $R^4$ represents hydrogen, methyl, chlorine or bromine, and

X represents a single bond, A $C_1$–$C_7$ alkylene, a $C_2$–$C_7$ alkylidene, a $C_3$–$C_7$ isoalkylidene, a $C_5$–$C_{12}$ cycloalkylene, a $C_5$–$C_{12}$ cycloalkylidene, —O—, —S—, —CO—, —SO—, —SO$_2$— or a radical corresponding to the formula (VII):

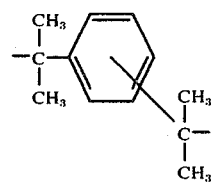

in which the two isopropylidene radicals are attached in the m- or p-position.

Preferred alkylene bonds X in formula (VI) are $C_1$–$C_5$ alkylenes; preferred alkylidene bonds X in formula (VI) are $C_3$–$C_5$ alkylidenes; the preferred isoalkylidene bond in formula (VI) is isopropylidene; preferred cycloalkylene bonds X in formula (VI) are $C_5$–$C_6$ cycloalkylenes; preferred cycloalkylidene bonds X in formula (VI) are $C_5$–$C_6$ cycloalkylidenes.

DETAILED DESCRIPTION OF THE INVENTION

The polycarbonates according to the invention are obtained by known methods of producing high molecular weight aromatic polycarbonates, for example:

a. by reacting from 5 to 100 mol parts of α,α,α,α′,α′λ,α′-hexakisaryl-1,3- and/or -1,4-dimethyl benzenes corresponding to the following formula (in short, 7-nucleus bisphenols):

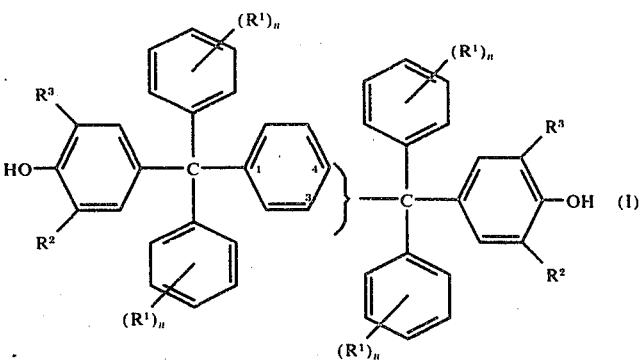

in which $R^1$, $R^2$, $R^3$ and $n$ are as defined in reference to formula (V), and 0 to 95 mol parts of other aromatic dihydroxy compounds, especially bisphenols, with phosgene in homogeneous phase in the presence of organic bases and, optionally, inert organic solvents, substantially insoluble bis-hydroxy compounds of the type corresponding to formula (I) being reacted in suspension; or b. in a two-phase mixture of an aqueous alkaline phase and an inert organic water-immiscible solvent or solvent mixture, by interfacial polycondensation of from 5 to 100 mol % of bis-hydroxy compounds corresponding to formula (I) and/or their bis-chlorocarbonic acid esters and/or oligomeric carbonates containing terminal chlorocarbonic acid ester groups and obtainable from compounds corresponding to formula (I), and 0 to 95 mol % of other bisphenols and/or their bis-chloro-carbonic acid esters and/or optionally oligomeric carbonates containing terminal chlorocarbonic acid ester groups and obtainable from the other bisphenols and, optionally phosgene, at least 1.05 chlorine equivalents attached through —CO— groups having to be used per phenolic OH-equivalent, in the presence of from 0.5 to 10 mol % of a catalyst, based on the molar sum of free bis-hydroxy compounds and/or bis-hydroxy compounds containing terminal chlorocarbonic acid ester groups and/or oligomeric bis-hydroxy compounds attached through carbonate groups and carrying terminal chlorocarbonic acid ester groups, and optionally in the presence of molecular weight limiters.

In the context of the invention, oligomeric carbonates containing terminal chlorocarbonic acid ester groups are oligocarbonates corresponding to the formula (VIII):

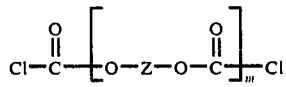

in which $m = 2$ to $10$,
which can be derived from the corresponding bisphenols HO—Z—OH. They are obtained by methods known from the literature, i.e. by reacting bisphenols with phosgene by the interfacial method in the absence of catalysts (cf. H. Schnell, Angew, Chem. 68, 633 (1956)).

The following bishydroxy compounds of formula (I) for example maybe used to produce the structural units corresponding to formula (V):

$\alpha,\alpha,\alpha',\alpha'$-tetraphenyl-$\alpha,\alpha'$-bis-(4-hydroxyphenyl)-1,4-dimethyl benzene (1), $\alpha,\alpha,\alpha',\alpha'$-tetrakis-(4-fluorophenyl)-$\alpha,\alpha'$-bis-(4-hydroxyphenyl)-1,4-dimethyl benzene (2), $\alpha,\alpha,\alpha',\alpha'$-tetrakis-(4-chlorophenyl)-$\alpha,\alpha'$-bis-(4-hydroxyphenyl)-1,4-dimethyl benzene (3), $\alpha,\alpha,\alpha',\alpha'$-tetrakis-(3,4-dichlorophenyl)-$\alpha,\alpha'$-bis-(4-hydroxyphenyl)-1,4-dimethyl benzene (4), $\alpha,\alpha,\alpha',\alpha'$-tetraphenyl-$\alpha,\alpha'$-bis-(3,5-dimethyl-4-hydroxyphenyl)-1,4-dimethyl benzene (5), $\alpha,\alpha,\alpha',\alpha'$-tetraphenyl-$\alpha,\alpha'$-bis-(4-hydroxyphenyl)-1,3-dimethyl benzene (6);

$\alpha,\alpha,\alpha',\alpha'$-tetraphenyl-$\alpha,\alpha'$-bis(4-hydroxy-3-chlorophenyl)-1.4-dimethyl-benzene (7) and $\alpha,\alpha,\alpha',\alpha'$-tetrakis-(p-methylphenyl)-$\alpha,\alpha'$-bis-(4-hydroxyphenyl)-1.4-dimethyl-benzene (8).

The 7-nucleus bishydroxy (1) is known from the literature (F. Ullmann and C. Schlaepfer, Ber. dtsch. chem. Ges. 37, 2001 (1904)). The 7-nucleus bishydroxy compounds (2) to (8) are known from the copending U.S. patent application by the same inventors entitled "A Process for the Production of $\alpha,\alpha,\alpha',\alpha'\lambda,\alpha'$-Hexakisaryl-1,3- and 1,4-Dimethyl Benzenes," Attorney's Docket No. Le A 15 681, respectively German patent application No. P 24 25 193, allowed U.S. application Ser. No. 579,533, filed May 21, 1975 of the same inventors and the same assignee as instant application.

The 7-nucleus bishydroxy compounds are produced in two stages from 1,3- and 1,4-xylenes corresponding to formula (IX) below:

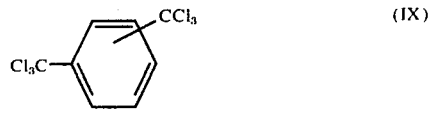

in which, in the first stage of the reaction, are reacted with an excess of aromatic compounds corresponding to the formula (X):

in which $R^1$ and $n$ are as defined in respect of formula (I), in the presence of a Friedel-Crafts catalyst, for example, $AlCl_3$, at temperatures preferably in the range of from 0° to 100° C; working up with concentrated hydrochloric acid or with water gives, in some cases quantitative yields of, $\alpha,\alpha,\alpha',\alpha'$-tetrakis-aryl-dichloro- or -dihydroxy-1,3- or -1,4-dimethyl benzenes corresponding to the general formula (II):

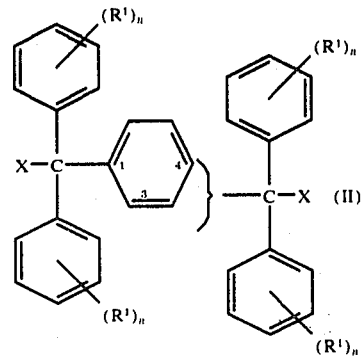

in which X is chlorine or OH, while $R^1$ and $n$ are as defined in respect of formula (I) (cf. German patent application No. P 24 25 194, Attorney's Docket Number LeA 15,494 filed on the same date).

In general, the reaction is carried out by slowly adding a solution of the $\alpha,\alpha,\alpha',\alpha',\alpha,\alpha'$-hexachloroxylene in the aromatic solvent dropwise to a suspension and/or solution of the Friedel-Crafts catalyst in the corresponding aromatic solvent.

In the second stage of the reaction (as is described in the copending US-application of the same inventors entitled "A Process for the Produktion of $\alpha,\alpha,\alpha,\alpha',\alpha'\lambda,\alpha'$-Hexykisaryl 1,3-and -1,4-Dimethyl Benzenes", Attorney's Docket No. Le A 15 681 respectively in the German Patent application P 24 25 193, allowed U.S.

application Ser. No. 579,533 filed May 21, 1975), the tetrakisaryl dichloro- or tetrakisaryl dihydroxy-xylenes are dissolved in several times the quantity of a monophenol corresponding to the formula (III):

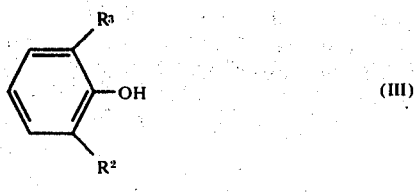

in which $R^2$ and $R^3$ are as defined above, at a temperature approximately 10° C above the melting temperature of the phenol used. Where the tetrakisaryl dichloroxylenes are used, the temperature of the reaction mixture is slowly increased to temperatures up to a maximum of 300° C, and the reaction mixture is stirred until the evolution of hydrogen chloride is over. Where the bishydroxy tetrakis compounds are used, the reaction is started merely by increasing the temperature, i.e. without adding a special catalyst, the water of condensation formed preferably being removed from the reaction mixture, for example, azeotropically with an inert entraining agent, such as toluene or xylene. It is, of course, also possible to prepare the dichloro compound in situ from the dihydroxy compound before and/or during the reaction by introducing hydrogen chloride gas into the reaction mixture, the dichloro compound thus prepared subsequently reacting with the phenol. The 7-nucleus bishydroxy compounds of formula (I) obtained in high yields can be worked up without difficulty. The reaction mixture is diluted with an organic solvent, for example, methylene chloride, ethanol or toluene, as a result of which excess phenol is dissolved and the 7-nucleus bishydroxy remains behind undissolved and may then be purified by known methods, for example, by recrystallization.

The bishydroxy compounds of formula (I) may be reacted by known methods (Houben-Weyl, Methoden der organischen Chemie, Vol. VIII, 1952, pages 101–104), to form the corresponding bis-chlorocarbonic acid esters corresponding to the formula (IV):

dichlorobenzene, methylene chloride, chloroform or carbon tetrachloride, and reacting the solution or suspension thus formed with from 2 to 10 times the molar quantity of phosgene in the presence of two to three times the molar quantity of a tertiary base, for example, N,N-dimethyl aniline, pyridine or alkylated pyridines which are intended to bind the hydrogen chloride gas formed during the reaction, at temperatures in the range from 0° C to 200° C and preferably at temperatures in the range of from 20° C to 150° C.

However, it is also possible initially to introduce a solution of phosgene in an inert organic solvent, followed by the dropwise addition at temperatures of from 0° to 50° C of a solution or suspension of the bisphenol of general formula (I) and the tertiary base in an inert organic solvent. In order to complete the reaction, the temperature is increased, optionally slowly, to the boiling temperature of the solvent used.

On completion of the reaction, the excess phosgene used, if any, is removed from the reaction mixture either by passing through an inert gas stream, for example, of nitrogen, or with greater advantage by distillation together with some of the solvent used. The hydrochloric acid amine salts formed as secondary products are subsequently washed out by repeated extraction of the organic solution with water. Concentration of the dried phase by evaporation leaves the bis-chlorocarbonic acid esters in general in the form of solid residues which may be purified by conventional techniques, for example, by precipitation, crystallization or dissolution and crystallization or recrystallization. The bis-chlorocarbonic acid esters of the following compounds, for example, maybe produced in this way:

$\alpha,\alpha,\alpha',\alpha'$-tetraphenyl-$\alpha,\alpha'$-bis-(4-hydroxyphenyl)-1,4-dimethyl benzene, $\alpha,\alpha,\alpha',\alpha'$-tetraphenyl-$\alpha,\alpha'$-bis-(4-hydroxyphenyl)-1,3-dimethyl benzene, $\alpha,\alpha,\alpha',\alpha'$-tetrakis-(4-fluorophenyl)-$\alpha,\alpha'$-bis-(4-hydroxyphenyl)-1,4-dimethyl benzene, $\alpha,\alpha,\alpha',\alpha'$-tetrakis-(4-chlorophenyl)-$\alpha,\alpha'$-bis-(4-hydroxyphenyl)-1,4-dimethyl benzene, $\alpha,\alpha,\alpha',\alpha'$-tetrakis-(3,4-dichlorophenyl)-$\alpha,\alpha'$-(4-hydroxyphenyl)-1,4-dimethyl benzene,

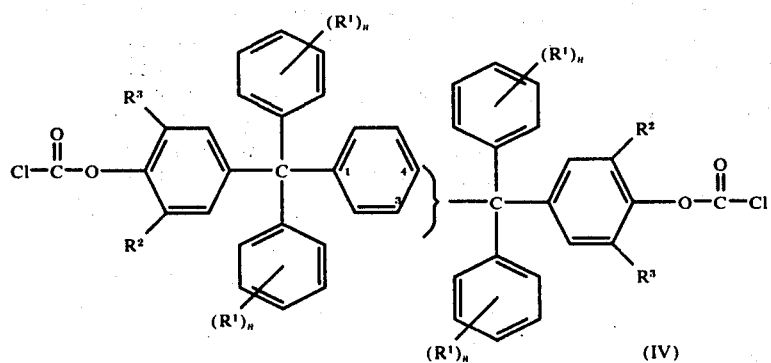

in which $R^1$, $R^2$, $R^3$ and $n$ are as defined in respect of formula (I).

In general, the bis-chlorocarbonic acid esters of formula (IV) are prepared by dissolving or suspending the $\alpha,\alpha,\alpha',\alpha'$-tetrakisaryl-$\alpha,\alpha'$-bis-(4-hydroxyphenyl)-1,3- or -1,4-dimethyl benzenes in an inert organic solvent, for example, benzene, toluene, xylene, chlorobenzene, $\alpha,\alpha,\alpha',\alpha'$-tetraphenyl-$\alpha,\alpha'$-bis-(4-hydroxy-3,5-dimethylphenyl)-1,4-dimethyl benzene;

$\alpha,\alpha,\alpha',\alpha'$-tetrakis-(p-methyl-phenyl)-$\alpha,\alpha'$-bis-(4-hydroxyphenyl)-1.4-dimethyl-benzene, and $\alpha,\alpha,\alpha',\alpha'$-tetraphenyl-$\alpha,\alpha'$-bis-(4-hydroxy-3-chlorophenyl)-1.4-dimethyl-benzene.

(see also the copending U.S. application by the same inventors entitled "A Process for the Production of α,α,α,α',α',α'-Hexakisaryl-1,3 and -1,4-Dimethyl Benzenes", Attorney's Docket No. LeA 15,681, allowed U.S. application Ser. No. 579,533 filed May 21, 1975).

Examples of aromatic bis-hydroxy compounds which can be co-polycondensed with the 7-nucleus bishydroxy compounds of formula (I) are hydroquinone, resorcinol, 4,4'-dihydroxy diphenyl, bis-(hydroxyphenyl)-alkanes, -cycloalkanes, -sulphides, -ethers, -ketones, -sulphoxides or -sulphones, α,α'-bis-(hydroxyphenyl)-diisopropyl benzenes, and also the corresponding nucleus-alkylated and nucleus-halogenated compounds.

These and other bis-hydroxy compounds suitable for production of the co-polycarbonates according to the invention are described in U.S. Pat. Nos. 2,970,131; 2,991,273; 2,999,835; 2,999,846; 3,014,891; 3,028,365; 3,062,781; 3,148,172; 3,271,367; 3,271,368; 3,280,078 and in DT-OS No. 1,570,703.

A few preferred aromatic bisphenols are, for example, 2,2-bis-(4-hydroxyphenyl)-propane (bisphenol A), bis-(4-hydroxyphenyl)-methane, 1,1-bis-(4-hydroxyphenyl)-cyclohexane, 2,2-bis-(3,5-dimethyl-4-hydroxyphenyl)-propane, 2,2-bis-(3,5-dichloro-4-hydroxyphenyl)-propane, 2,2-bis-(3,5-dibromo-4-hydroxyphenyl)-propane and α,α'-bis-(4-hydroxyphenyl)-p-diisopropyl benzene.

Molecular weight limiters suitable for use in the polycondensation reaction include phenol and monosubstituted or polysubstituted monophenols such as, for example, p-tert.-butyl phenol or 2,6-dimethyl phenol.

The polycarbonates according to the invention can be branched through the incorporation of small quantities of polyhydroxy compounds, for example, from 0.05 to 2.0 mol %, based on the molar sum of bis-hydroxy compounds incorporated.

Preferred polyhydroxy compounds are trishydroxy compounds or tetrahydroxy compounds.

The production of polycondensates branched through polyhydroxy compounds is described, for example, in German Offenlegungsschrift Nos. 1,570,533, 2,116,974 and 2,113,347, in British Patent Specification No. 1,079,821 and in U.S. Patent No. Re. 27,682.

Examples of suitable polyhydroxy compounds are inter alia phloroglucinol, 4,6-dimethyl-2,4,6-tri-(4-hydroxyphenyl)-2-heptene, 4,6-dimethyl-2,4,6-tri-(4-hydroxphenyl)-heptane, 1,3,5-tris-(4-hydroxyphenyl)-benzene, 1,1,1,-tri-(4-hydroxyphenyl)-ethane, tris-(4-hydroxyphenyl)-phenyl methane, 2,2-bis-[4,4-(4,4'-dihydroxy diphenyl)-cyclohexyl]-propane, 2,4-bis-(4-hydroxyphenyl-4-isopropyl-phenyl)-phenol, 2,6-bis-(2'-hydroxy-5'-methyl benzyl)-4-methylphenol, 2,4-dihydroxy benzoic acid, 2-(4-hydroxyphenyl)-2-(2,4-dihydroxyphenyl)-propane and 1,4-bis-(4,4'-dihydroxy triphenyl methyl) benzene.

Examples of inert organic solvents suitable for use in the production of the polycarbonates include chlorinated aliphatic hydrocarbons, such as methylene chloride, chloroform and 1,2-dichloroethane, aromatic hydrocarbons such as benzene, toluene, xylenes, chlorobenzene, chlorotoluene and dichlorobenzenes, or mixtures of chlorinated aliphatic hydrocarbons and aromatic hydrocarbons.

Organic bases suitable for use where polycondensation is carried out in an homogeneous phase include tertiary amines such as triethylamine or, preferably, pyridine and methyl-substituted pyridines.

Catalysts suitable for use in the interfacial polycondensation reaction include quaternary ammonium compounds, such as tetramethyl ammonium hydroxide, triethyl benzyl ammonium hydroxide, triethyl benzyl ammonium chloride or, preferably, tertiary amines such as triethylamine, N,N-dimethyl cyclohexylamine, dimethyl benzylamine or triethylene diamine.

In cases where the polycarbonates according to the invention are produced by interfacial polycondensation, the 7-nucleus dihydroxy compounds and/or optionally the bisphenols to be co-condensed which, on account of their hydrophobic nature, do not produce bisphenolate solutions, are reacted without disadvantage in the form of a suspension of the alkali bisphenolates in aqueous alkali liquor, preferably in sodium or potassium hydroxide. The quantity of phosgene required is governed by the starting compounds used, by the stirring effect and by the reaction temperature, which may be in the range of from about 10° to about 90° C, and amounts to at least 1.05 mol per mol of bisphenol and generally to between 1.1 and 3.0 mols of phosgene per mol of bis-hydroxy compound. The polycarbonates obtained on completion of polycondensation in the presence of tertiary amine are isolated by the usual methods, for example, by separating off the aqueous phase, washing the organic phase with water until it is free from electrolyte and then precipitating the polycarbonate or distilling off the solvent.

The new polycarbonates according to the invention based on 7-nucleus dihydroxy compounds generally have average molecular weights (determined by the light-scattering method) of from 10,000 to 300,000, preferably from 20,000 to 200,000. Depending upon their composition and molecular weight, they can be processed by conventional methods into shaped articles, fibers, sheets and films. They can also be effectively used in admixture with fillers, for example, carbon black or minerals, with substances added for effect, glass fibers, pigments, dyes, stabilizers and other additives. They can also be mixed with other polymers. They may be used with considerable advantage for any applications involving high service temperatures coupled with a need for favorable mechanical and electrical properties.

The products are eminently suitable, for example, for the production of electrical insulating films with good ageing behavior at elevated temperatures.

The invention is illustrated by, but by no means limited to, the following Examples. Unless otherwise indicated, the relative viscosities ($\eta_{rel}$) quoted relate to 0.5% by weight solutions of the polycarbonates in the solvents mentioned in brackets measured at 25° C.

EXAMPLE 1

Polycarbonate of α,α,α',α'-tetraphenyl-α,α'-bis-(4-hydroxyphenyl)-1,4-dimethyl benzene (1) (7-nucleus dihydroxy compound (1))

A solution of 7.1 g (0.01 mol) of the bis-chlorocarbonic acid ester of (1) (prepared by known methods by reacting the 7-nucleus dihydroxy compound with phosgene in toluene at 70° to 90° C in the presence of N,N-dimethyl aniline as HCl-acceptor; mp.: 251°–252° C (from xylene) in 60 ml of $CH_2Cl_2$) is run quickly with intensive stirring at 20° to 25° C into an aqueous solution of 1.8 g (0.045 mol) of NaOH in 45 ml of water, followed by the addition of 3 ml of a 1% aqueous triethylamine solution. This is followed by stirring for 1 hour. The entire reaction is carried out under an atmosphere of nitrogen.

The aqueous phase is separated off, and the organic phase diluted with 100 ml of $CHCl_3$, washed twice with 100 ml of 2% $H_3PO_4$ and finally with distilled water until neutral. After drying over anhydrous $Na_2SO_4$, the organic phase is concentrated to a residual volume of approximately 50 ml and added dropwise to $CH_3OH$, as a result of which the polycarbonate is precipitated in the form of white flakes. Drying for 15 hours at 100° C/15 Torr leaves 5.9 g (95%) of polycarbonate.

$\eta_{rel} = 1.234$ ($CHCl_3$); $\overline{M}_{LS} = 114,000$

Second order transition temperature point (as determined by differential thermoanalysis = DTA): 228° C Transparent films are obtained from a $CHCl_3$ solution.

EXAMPLE 2

Copolycarbonate of 7-nucleus dihydroxy compound (1) (60 mol parts) and bisphenol A (40 mol parts)

A solution of 22.67 g (31.5 m mol) of 7-nucleus bischlorocarbonic acid ester in 320 ml of $CH_2Cl_2$ is quickly run at 20° to 25° C under a nitrogen atmosphere into a solution of 4.8 g (0.021 mol) of bisphenol A and 4.07 g (0.1 mol) of NaOH in 175 ml of water, followed by the addition of 15.3 ml of a 1% aqueous triethylamine solution. The mixture is left to react for 1 hour with intensive stirring. The reaction mixture is then worked up in the same way as in Example 1, giving 22.9 g (92%) of polycarbonate.

$\eta_{rel} = 1.443$ ($CH_2Cl_2$)

Films with the following properties were obtained from a $CH_2Cl_2$ solution:

Tensile strength ($\sigma_R$) = 77 MPa; elongation at break ($\epsilon_R$) = 15%

E-modulus (stretching test): 3120 MPa;
Second order transition point (DTA): 204° C.

EXAMPLE 3

Copolycarbonate of 7-nucleus dihydroxy compound (1) (40 mol parts) and bisphenol A (60 mol parts)

As in Example 2, a solution of 3.77 g (16.5 m mol) of bisphenol A and 5.73 g (0.143 mol) of NaOH in 210 ml of water is reacted with a solution of 5.83 g (16.5 m mol) of bisphenol A bischlorocarbonic acid ester and 15.83 g (22 m mol) of the 7-nucleus bis-chlorocarbonic acid ester in 220 ml of $CH_2Cl_2$ in the presence of 11.1 ml of a 1% aqueous triethylamine solution, followed by working up again as in Example 2.

Yield: 21.3 g (97%) of copolycarbonate $\eta_{rel} = 1.678$ ($CH_2Cl_2$)

A transparent film is obtained from a $CH_2Cl_2$ solution. The film was found by measurement to have the following properties:

Tensile strength ($\sigma_R$): 67.1 MPa; elongation at break ($\epsilon_R$): 56%

E-modulus (stretching test): 2800 MPa;
Second order transition point (DTA): 196° C;
Thermal decomposition: at upwards of about 400° C.

EXAMPLE 4

Polycarbonate of $\alpha,\alpha,\alpha',\alpha'$-tetrakis-(4-chlorophenyl)-$\alpha,\alpha'$-bis-(4-hydroxyphenyl)-1,4-dimethyl benzene (3) (7-nucleus tetrachlorodihydroxy compound)

8.58 g (0.01 mol) of the 7-nucleus tetrachloro bis-chlorocarbonic acid ester (obtained from (3) by reaction with phosgene in chlorobenzene at 55° to 60° C in the presence of N,N-dimethyl aniline as HCl-acceptor; mp.: 227°–230° C; Cl-analysis: Calculated 24.8%, Found 24.2%) are reacted for 1 hour in a two-phase mixture of aqueous sodium hydroxide (1.85 g of NaOH in 60 ml of $H_2O$) and methylene chloride (60 ml) in the presence of 2 ml of a 1% aqueous triethylamine solution, and the reaction product is worked up in the same way as described in Example 1.

Yield: 6.9 g (91%) of a white polycarbonate in the form of fine flakes.

$\eta_{rel} = 1.263$ ($CH_2Cl_2$)

Average molecular weight as determined by membrane osmosis ($\overline{M}_{OS}$): 38,200 (in $CHCl_3$)

Second order transition point (DTA): 240° C

Transparent films are obtained from a $CH_2Cl_2$ solution. The approximately 80 $\mu$m thick film, which burned without dripping in the flame, went out in less than 5 seconds following removal from the flame.

EXAMPLE 5

Copolycarbonate of 7-nucleus tetrachloro dihydroxy compound (3) (43.4 mol parts) and bisphenol A (56.6 mol parts)

A solution of 4.56 g (0.02 mol) of bisphenol A and 3.9 g (97.5 m mol) of NaOH in 160 ml of water is reacted with a solution of 21.44 g (25 m mol) of the 7-nucleus tetra bis-chlorocarbonic acid ester and 4.44 g (12.6 m mol) of bisphenol A bis-chlorocarbonic acid ester in 200 ml of $CH_2Cl_2$ in the presence of 10.1 ml of a 1% aqueous triethylamine solution, and the reaction product is worked up in the same way as in Example 2.

Yield: 25.9 g (95%) of flaky, white polycarbonate $\eta_{rel} = 1.487$ ($CH_2Cl_2$)

Second order transition temperature (DTA): 212° C

The following mechanical properties were measured on 75 $\mu$m thick transparent films of the copolycarbonate: Tensile strength ($\sigma_R$): 80 MPa; elongation at break ($\epsilon_R$): 10%

E-modulus (stretching test): 3100 MPa;
Cl-analysis: Calculated 13.0%, Found 12.9%.

EXAMPLE 6

Copolycarbonate of 7-nucleus dihydroxy compound (1) (6.5 mol parts) and bisphenol A (93.5 mol parts)

2.97 g (5 m mol) of the 7-nucleus bisphenol are suspended with stirring in a nitrogen atmosphere in a solution of 6 g (0.15 mol) of NaOH in 90 ml of $H_2O$, and the resulting suspension is heated for 2 hours to reflux temperature. After cooling to room temperature, a suspension of the substantially insoluble di-Na-salt of 7-nucleus bisphenol in aqueous sodium hydroxide is obtained. 16.45 g (72 m mol) of bisphenol A are then added and dissolved and, following the addition of 90 ml of $CHCl_3$ at pH 13, phosgene is introduced until no more solids are present. Approximately 14.9 g (0.15 mol) of $COCl_2$ are consumed. 15 ml of a 1% aqueous triethylamine solution are then added, followed by stirring for 1 hour at pH 13. The reaction product is worked up in the same way as in Example 1.
Yield: 20 g (93%) of white, flaky product; NMR-spectrum (CDCL$_3$): H$_{aliphat.}$: H$_{aromat.}$ = 1 : 1.7
$\eta_{rel}$ = 1.397 (CHCl$_3$)
Second order transition point (DTA): 161° C

EXAMPLE 7

Copolycarbonate of 7-nucleus dihydroxy compound (1) (20 mol parts) and bisphenol A (80 mol parts)

Following the procedure of Example 6, 11.89 g (0.02 mol) of the 7-nucleus dihydroxy compound are converted into the disodium salt in a solution of 8 g (0.2 mol) of NaOH in 200 ml of water. Following the addition of 18.25 g (0.08 mol) of bisphenol A and 200 ml of CHCl$_3$, the intensively stirred two-phase mixture is reacted at room temperature with COCl$_2$ until the suspended sodium salt of the 7-nucleus dihydroxy compound has entered into solution and the aqueous phase is free from bisphenol. Approximately 19.8 to 29.7 g (0.2 to 0.3 mol) of COCl$_2$ are required for this purpose. Following the addition of triethylamine (20 ml of a 1% aqueous solution), the reaction mixture is further reacted and worked up in the same way as in Example 6.
Yield: 30 g (92%) of a white, flaky polycarbonate
$\eta_{rel}$ = 1.300 (CHCl$_3$)
Second order transition point (DTA): 170° C;
NMR-spectrum (CDCl$_3$): H$_{aliphat.}$ : H$_{aromat.}$ = 1 : 2.5.

EXAMPLE 8

Copolycarbonate of 7-nucleus dihydroxy compound (1) (80 mol parts) and bisphenol A (20 mol parts)

A solution of 2.28 g (0.01 mol) of bisphenol A and 6.4 g (0.16 mol) of NaOH in 200 ml of water is reacted as in Example 2 with a solution of 28.8 g (0.04 mol) of the 7-nucleus bis-chlorocarbonic acid ester in 340 ml of chloroform at a pH value of 13 in the presence of 10 ml of a 1% aqueous triethylamine solution, and the reaction mixture is worked up again as in Example 2.
The polymer precipitated has a relative solution viscosity of 1.243 (CHCl$_3$).

EXAMPLE 9

Copolycarbonate of 7-nucleus dihydroxy compound (1) (50 mol parts) and bisphenol A (50 mol parts) branched with 1,4-bis-(4,4'-dihydroxy triphenyl methyl)-benzene (0.1 mol %)

A solution of 4.11 g (18 m mol) of bisphenol A, 40.4 mg of 1,4-bis-(4,4'-dihydroxy triphenyl methyl)-benzene and 6 g (0.15 mol) of NaOH in 160 ml of water is reacted as in Example 2 with a solution of 4.24 g (12 m mol) of bisphenol A bis-chlorocarbonic acid ester and 21.6 g (30 m mol) of the 7-nucleus bis-chlorocarbonic acid ester in 340 ml of chloroform in the presence of 12 ml of a 1% aqueous triethylamine solution, and the reaction mixture is worked up again as in Example 2. The polymer precipitated from methanol has a relative solution viscosity of 1.290 (CHCl$_3$).

EXAMPLE 10

Copolycarbonate of 7-nucleus dihydroxy compound (1) (60 mol parts) and 1,1-bis-(4-hydroxyphenol)-cyclohexane (40 mol parts)

A solution of 5.36 g (0.02 mol) of 1,1-bis-(4-hydroxyphenyl)-cyclohexane and 4 g (0.1 mol) of NaOH in 200 ml of water is reacted as in Example 2 with a solution of 21.6 g (0.03 mol) of the 7-nucleus bis-chlorocarbonic acid ester in 340 ml of chloroform for 1 hour at pH 13 in the presence of a 1% aqueous triethylamine solution, and the reaction mixture is worked up again as in Example 2.
Yield: 22.8 g (93%) of polycarbonate
$\eta_{rel}$ = 1.262 (CHCl$_3$)
Second order transition point (DTA): 205° C

EXAMPLE 11

Copolycarbonate of 7-nucleus dihydroxy compound (1) (65 mol parts) and 4,4-dihydroxy diphenyl sulphone (35 mol parts)

A solution of 5.0 g (0.02 mol) of 4,4'-dihydroxy diphenyl sulphone and 5.2 g (0.13 mol) of NaOH in 200 ml of water is reacted as in Example 2 with a solution of 26.8 g (37.5 m mol) of the 7-nucleus bis-chlorocarbonic acid ester in 340 ml of chloroform in the presence of 12 ml of a 1% aqueous triethyl amine solution, and the reaction mixture is worked up again as in Example 2. The polymer precipitated from methanol has a relative solution viscosity of 1.170 (CHCl$_3$) and a second order transition temperature (DTA) of 218° C.

EXAMPLE 12

Polycarbonate of α,α,α',α'-tetraphenyl-α,α'-bis-(4-hydroxyphenyl)-1,3-dimethyl benzene (6) (m-7-nucleus dihydroxy compound)

a. Preparaton of the bis-chlorocarbonic acid ester of (6)

The reaction of a suspension of 47.6 g (0.08 mol) of m-7-nucleus dihydroxy compound (6) (mp. 260°–272° C) in 750 ml of toluene with 47.5 g (0.48 mol) of COCl$_2$ at approximately 70° C in the presence of 21.4 g (0.176 mol) of N,N-dimethyl aniline, followed by working up (washing dilute hydrochloric acid and then with water, drying over Na$_2$SO$_4$ and concentration by evaporation in vacuo), gives a yellow oil which, after drying, solidifies at 80° C/15 Torr. Yield: 53.9 g (93.5%); mp. 108°–112° C (decomp.); hydryzable chlorine: calculated 9.95%, found 9.6%.

b. Polycondensation of the m-7-nucleus-(6)-bis-chlorocarbonic acid ester

Following the procedure of EXAMPLE 1, a solution of 10.8 g of m-7-nucleus-(6)-bis-chlorocarbonic acid ester in 125 ml of chloroform is run into a solution of 2.9 g of NaOH in 150 ml of water, followed by condensation for 1 hour at pH 13 in the presence of 3 ml of a 1% aqueous triethylamine solution. Working up in accordance with Example 1 gives 8.5 g (91%) of polymer.
$\eta_{rel}$ = 1.142 (CHCl$_3$)
Second order transition point (DTA): 180° C

EXAMPLE 13

Copolycarbonate of m-7-nucleus dihydroxy compound (6) (70 mol parts) and bisphenol A (30 mol parts)

A solution of 10.08 g (0.014 mol) of m-7-nucleus bis-chlorocarbonic acid ester in 130 ml of CHCl$_3$ is reacted as in Example 2 with a solution of 1.37 g (6 m mol) of bisphenol A and 2.3 g (57.5 m mol) of NaOH in 130 ml of H$_2$O in the presence of 4 ml of a 1% aqueous triethylamine solution, and the reaction mixture is worked up again as in Example 2.
Yield: 9.5 g (93%) of a white, flaky polymer $\eta_{rel} = 1.222$ (CHCl$_3$)

EXAMPLE 14

Copolycarbonate of α,α,α',α'-tetrakis-(3,4-dichlorophenyl)-α,α'-bis-(4-hydroxyphenyl)-1,4-dimethyl benzene (4) (70 mol parts) and bisphenol A (30 mol parts)

a. Preparation of the bis-chlorocarbonic acid ester of (4)

In the same way as for the preparation of the bis-chlorocarbonic acid ester of (6) (cf. Example 12), 43.5 g (0.05 mol) of α,α,α',α'-tetrakis-(3,4-dichlorophenyl)-α,α'-bis-(4-hydroxyphenyl)-1,4-dimethyl benzene are reacted at 75° C with 29.7 g (0.3 mol) of COCl$_2$ and the reaction product is worked up in the same way. The crude product remaining after evaporation of the toluene is recrystallized from xylene.
Yield: 40 g (80%) of white product;
Melting point: 288°–290° C (decomp.);
Cl-analysis: Calculated 35.6%, Found 35.3%.

b. Polycondensation

A suspension of 11.64 g (11.7 m mol) of the bis-chlorocarbonic acid ester of (4) in 155 ml of chloroform is reacted as in Example 2 with a solution of 1.14 g (5 m mol) of bisphenol A and 2.1 g (52.5 m mol) of NaOH in 150 ml of water in the presence of 3.5 ml of a 1% aqueous triethylamine solution and the reaction product is worked up again as in Example 2.
Yield: 10.4 g (89%) of polymer
$\eta_{rel} = 1.240$ (CHCl$_3$)
Second order transition temperature (DTA): 218° C.

It is to be understood that any of the components and conditions mentioned as suitable herein can be substituted for its counterpart in the foregoing examples and that although the invention has been described in considerable detail in the foregoing, such detail is solely for the purpose of illustration. Variations can be made in the invention by those skilled in the art without departing from the spirit and scope of the invention except as it may be limited by the claims.

15
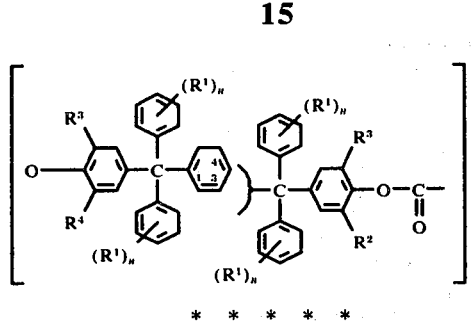
16
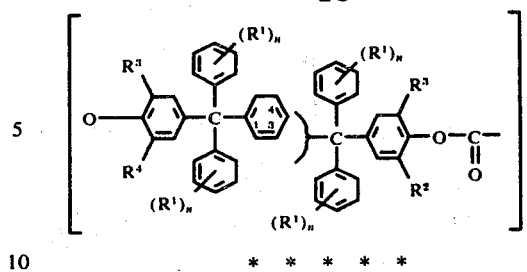

What is claimed is:

1. High molecular weight polycarbonates based on aromatic dihydroxy compounds containing from 5 mol % to 100 mol %, based on incorporated dihydroxy compounds, of structural units corresponding to the formula (V):

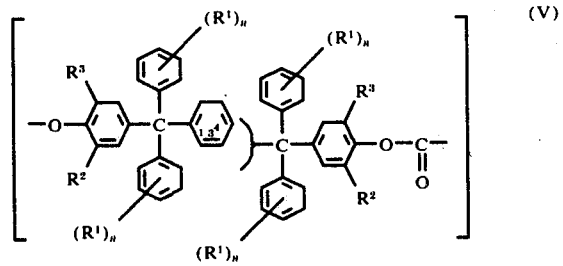

in which
R$^1$ represents C$_1$–C$_4$ alkyl, halogen or H;
n = 1, 2 or 3; and
R$^2$ and R$^3$, independently of one another, represents C$_1$–C$_3$ alkyl, halogen or H.

2. Polycarbonates as claimed in claim 1, wherein they contain from 5 mol % to 90 mol % (based on incorporated dihydroxy compounds) of structural units corresponding to formula (V) and from 95 mol % to 10 mol % (based on incorporated dihydroxy compounds) of structural units corresponding to the formula (VI):

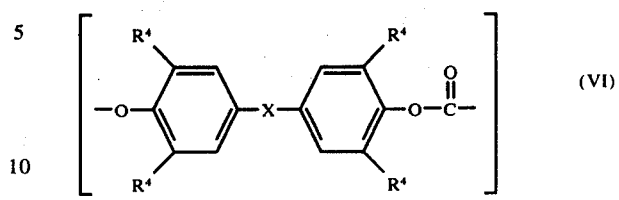

in which R$^4$ represents H, methyl, chlorine or bromine; and X is a single bond, a C$_1$–C$_7$ alkylene, a C$_2$–C$_7$ alkylidene, a C$_3$–C$_7$ isoalkylidene, a C$_5$–C$_{15}$ cycloalkylene, a C$_5$–C$_{12}$ cycloalkylidene, —O—, —S—, —CO—, —SO—, —SO$_2$—, or a radical corresponding to the formula (VII):

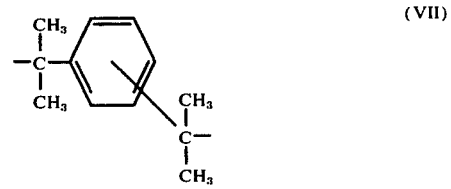

in which the two isopropylidene radicals are attached in the m- or p-position.

3. Polycarbonates as claimed in claim 1, wherein aromatic polyhydroxy compounds are incorporated into them as branching agents in quantities of from 0.05 mol % to 2.0 mol % based on incorporated bis-hydroxy compounds.

4. Polycarbonates as claimed in claim 2, wherein they contain from 20 mol % to 70 mol % (based on incorporated dihydroxy compounds) of structural units corresponding to formula (V) and from 80 mol % to 30 mol % (based on incorporated dihydroxy compounds) of structural units corresponding to formula (VI).

5. Polycarbonates as claimed in claim 1, wherein they contain structural units of formula (V) in which R$^2$ = R$^3$ = H.

6. Polycarbonates as claimed in claim 2, wherein they contain structural units of formula (VI) in which R$^4$ represents H and X represents isopropylidene.

7. Polycarbonates as claimed in claim 1, which contain from 20 to 100 mol % of structural units corresponding to formula (V).

8. Polycarbonates according to claim 1, which have molecular weights determined by light scattering of between 10,000 and 300,000.

9. Polycarbonates according to claim 8, which have molecular weights determined by light scattering of between 20,000 and 200,000.

10. In high molecular weight polycarbonates consisting of structural units of the general formula

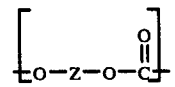

wherein Z is the hydroxyl free residue of aromatic dihydroxy compounds the improvement wherein 5 to 100 mol % of the structural units have the formula (V):